June 3, 1947.  H. L. SMITH, JR  2,421,527
CAN FEEDING MECHANISM
Filed Oct. 1, 1945  2 Sheets-Sheet 1

Inventor
Horace L. Smith, Jr.,

B.B. Collins
Attorney

June 3, 1947.  H. L. SMITH, JR  2,421,527
CAN FEEDING MECHANISM
Filed Oct. 1, 1945  2 Sheets-Sheet 2
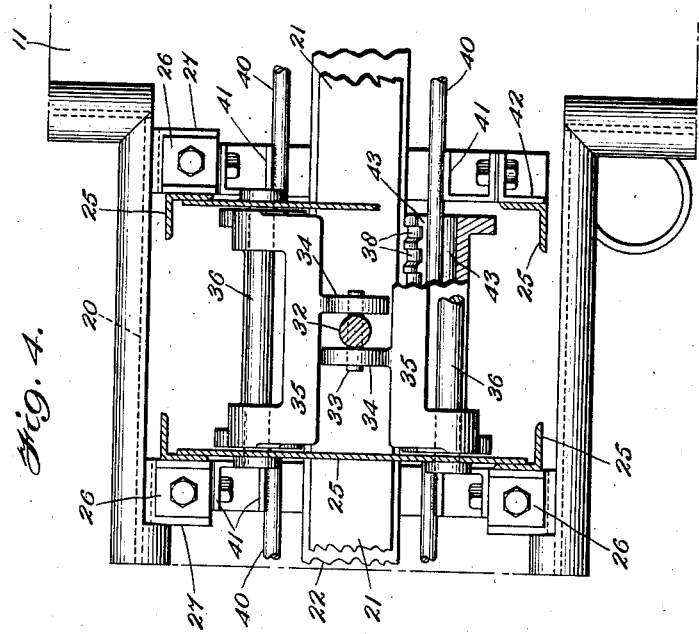
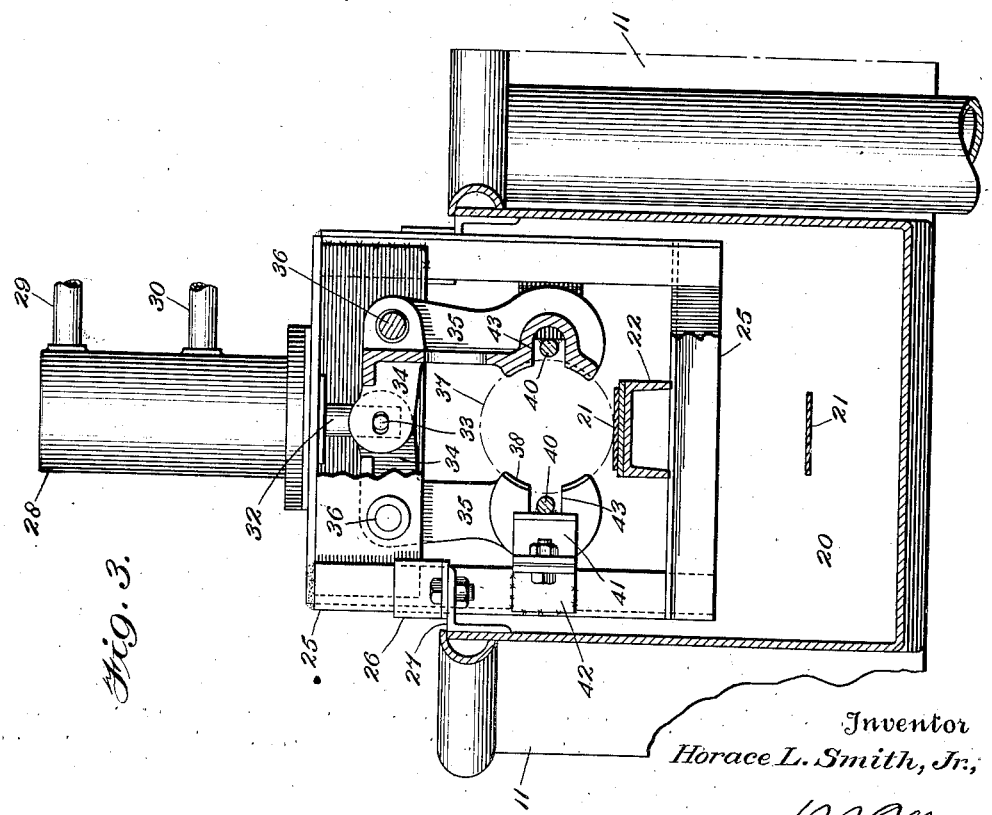
Inventor
Horace L. Smith, Jr.
B. B. Collings
Attorney Patented June 3, 1947

2,421,527

UNITED STATES PATENT OFFICE 2,421,527

CAN FEEDING MECHANISM

Horace L. Smith, Jr., Richmond, Va., assignor to Chain Belt Company, Milwaukee, Wis., a corporation of Wisconsin Application October 1, 1945, Serial No. 619,637

3 Claims. (Cl. 198—34)

The invention relates to can feeding mechanism, and while susceptible of use in various kinds of apparatus, for purposes of disclosure it has been here illustrated and will be described as applied to a heat exchange apparatus for processing materials in sealed containers, of the type disclosed in prior U. S. Patent No. 2,348,440, granted May 9, 1944, on an application filed by Weld E. Conley, Jr., and myself.

Briefly, the machine of that patent comprises one or more vats or tanks each of which has mounted within it a series of power driven can-supporting rolls disposed in spaced parallel relationship to provide valleys between adjacent rolls which receive columns of sealed cans containing food or other products the temperature of which is to be raised and/or lowered. The can are supplied to and maintained in the valleys in end-to-end alinement and are partially submerged in a flowing heat exchange medium, such as water, contained in the tank, in which they are rotated by the supporting rolls, whereby the temperature of the cans and contents is raised and/or lowered. From time to time the several lines of cans are simultaneously advanced from valley to valley through the series, and from the last valley they are transferred to a conveyer or other appropriate discharge mechanism.

With each transfer of the several lines of cans from valley to valley, a fresh batch of alined cans is supplied to the first valley of the series so that the machine is kept continuously filled to capacity. In the aforesaid patent the means for thus supplying the cans to the roll series comprises a continuously operating endless belt conveyer extending transversely of the tank at its feed end. The cans are deposited upon this conveyer at one side of the tank from whence it conveys them in longitudinal alinement to a position adjacent and parallel to the first roll of the series. Here they are engaged by a reciprocating feed bar, which is movable transversely of the line of cans on the conveyer and is moved forwardly simultaneously with the transfer of the preceding lines of cans from valley to valley, whereby the fresh batch is moved from the conveyer, over the first roll and into the first valley.

Since only a determined number of cans can be accommodated in each valley, and since as above stated, the feed conveyer operates continuously, means are provided for interrupting the flow of cans to the feeding position each time such determined number has entered the tank, whereby the feed bar may function freely. This means comprises a gripping mechanism associated with the conveyer at the point where the latter enters the main portion of the tank, which mechanism of course is operated in timed relation to the can feed and transfer functions. The mechanism comprises a pair of jaws which are operable each time the determined number of cans has passed, to grip the succeeding can and thereby arrest its movement and that of all cans following it. The conveyer belt slides beneath the arrested cans, and as soon as the feed bar and transfer mechanism have performed their functions, the gripped can is released and movement of the line of cans into the tank resumed.

The present invention relates more especially to this can arresting mechanism, and has for its principal object the provision of an improved construction thereof, and one in which twisting or canting of the cans on the conveyer belt, with consequent jamming of the feed, is prevented. Other objects will appear as the description proceeds.

In the accompanying drawings forming a part of this specification:

Fig. 3 is an enlarged sectional-elevational view, on approximately the planes indicated by the line 3—3 of Fig. 1, looking in the direction of the arrows; and Fig. 4 is a sectional plan view on the plane indicated by the line 4—4 of Fig. 2, looking down.

Figure 1:
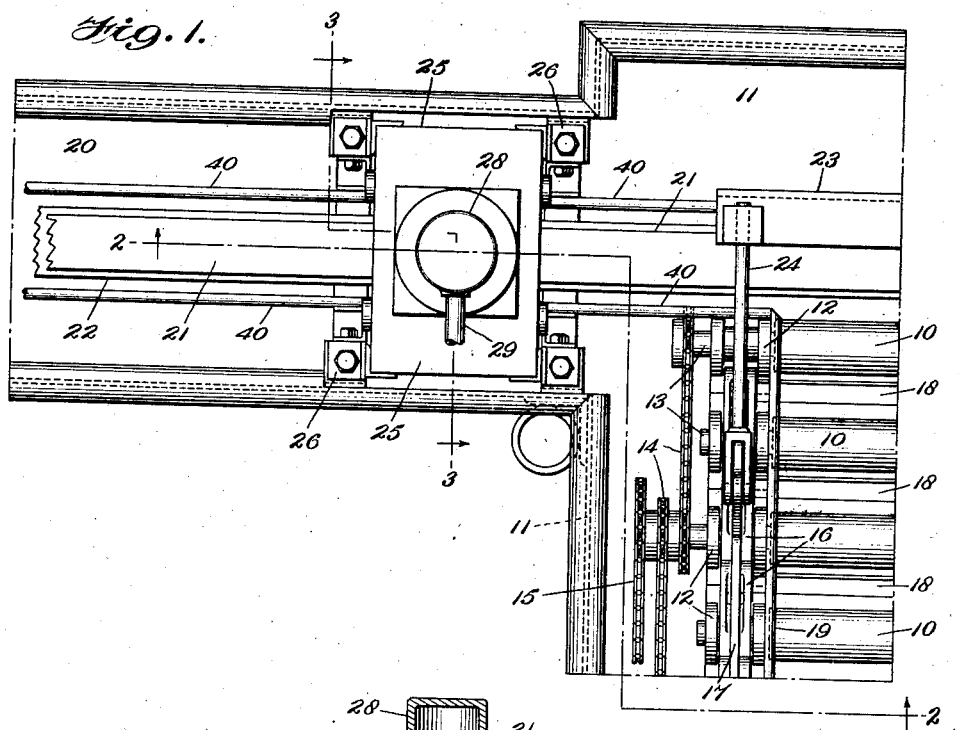
Figure 1 is a fragmentary plan view of the feed end of one deck of a processing machine of the type above mentioned, which is equipped with one form of can gripping mechanism constructed and arranged in accordance with the invention.

Referring to the said drawings more in detail, the series of parallel spaced can-supporting rolls 10 is mounted in the main portion of the vat or tank 11 by means of bearing brackets 12 which journal the shafts or trunnions 13 of the several rolls. Alternate roll shafts are interconnected at one end by chain and sprocket drives 14 and one of them is supplied with power from any suitable source, not shown, by a chain and sprocket drive 15, whereby all such rolls may be uni-directionally rotated. The remaining rolls are driven in like direction by similar drives located at the opposite side of the machine. Each bearing bracket 12 (except the pair mounting the first roll of the series) also journals an upwardly extending transfer arm 16, with the upper ends of all of the arms at each side of the apparatus being pivotally connected to a draw bar 17, which bars are reciprocatable by power means, not shown, whereby all of the arms may be oscillated in unison. The pair of arms associated with each roll carry a transfer bar 18 disposed in parallel relationship to the roll, and as the arms are oscillated the transfer bars are moved into and out of the valleys between adjacent rolls whereby the lines of cans in the respective valleys are raised and advanced over the rolls into the next adjacent valley. A guide rail 19, supported by certain of the bearing brackets 12, extends throughout the length of the roll series, adjacent each end of the rolls, which rails prevent or limit endwise movement of the lines of cans as they are rotated and advanced.

The tank 11 is provided with a lateral extension or chamber 20 in which is mounted one end of an endless belt conveyer 21 the upper run of which is supported by a channel member 22. This conveyer extends into and across the main portion of the tank parallel and adjacent to the first roll of the series, as will be clear from Fig. 1. A reciprocatable feed bar 23 parallels the conveyer belt 21 and is movable back and forth across it by the draw bars 17 through connections 24. Thus, cans which may be deposited upon the conveyer in the chamber 20 will be carried by it to positions adjacent the first roll 10, whereupon reciprocation of the feed bar 23 will transfer them to the valley between the first two rolls of the series, from which they will be progressively advanced to the succeeding valleys with each actuation of the transfer mechanism.

The gripping mechanism for intermittently arresting movement of the line of cans each time a determined number of them has been carried into the tank 11 by the conveyer 21, is disposed in the chamber 20 at substantially its juncture with the tank. The mechanism is constructed as a readily removable unit, and comprises a framework 25 provided with lugs or brackets 26 by means of which it may be readily detachably secured to companion brackets 27 carried by the walls of the chamber 20. The frame is surmounted by a motor or power supplying device, here shown as of the hydraulic or fluid pressure type comprising a cylinder 28 having connections 29 and 30 for admission and discharge of fluid under pressure whereby to induce reciprocation of a piston 31 mounted in said cylinder. The piston has a piston rod 32 the lower end of which has pin and slot connections 33 with the ears 34 of a pair of opposed gripping members or jaws 35 which are pivotally mounted in the framework by pins 36. The lower portions of the members 35 are provided with arcuate faces conforming to the periphery of a can 37 (Fig. 3). These faces are preferably provided with a series of grooves 38 for receiving the beads usually formed at the can ends in the heading of the same, while the lands between the grooves may have gripping engagement with relatively large surface areas of the can body.

From what has been thus far disclosed it will be readily understood that with the admission of fluid under pressure to the cylinder 28 through the pipe 29 the piston 31 will be forced downwardly with resultant spreading of the gripping members 35 and release of the can 37, whereby the conveyer 21 may move it and the ones following it into the tank 11. On the other hand, when a determined number of cans has been thus fed into the tank, upon admission of fluid under pressure through pipe 30 to the lower part of cylinder 28 (with simultaneous release of pressure from the upper part of the cylinder) the piston 31 will be forced upwardly and the jaw members 35 drawn toward one another with a consequent gripping of a can by their serrated arcuate faces. Movement of this can and those following it will thus be arrested, although the conveyer belt 21 will continue its movement, sliding beneath the arrested cans. This continued movement of the belt serves to complete movement of the determined number of cans to their proper position adjacent the feed bar 23, for transfer thereby to the first valley of the roll series.

Figure 2:
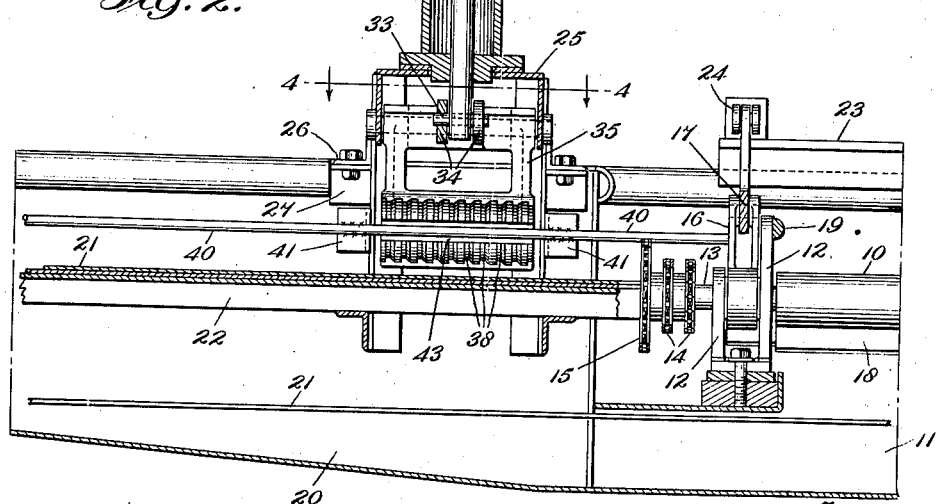
Fig. 2 is a cross sectional view on approximately the planes indicated by the line 2—2 of Fig. 1, looking in the direction of the arrows.

Unless the cans on the conveyer belt are restrained against lateral displacement, upon release of the gripping mechanism a can which has been gripped is quite apt to move sidewise and/or to twist to a diagonal position, with consequent interference with or jamming of the feed. This misalinement may result, at least in part, from failure of the can beads to completely clear the jaw serrations 38 as the conveyer belt 21 begins renewed movement of the can. To avoid this a guide rod 40 is mounted to either side of the conveyer belt 21 and somewhat above the plane of its upper run, which rods extend from within the chamber 20 through the gripping mechanism and into the tank 11 at least as far as the end of the feed bar 23. These rods have brackets 41 welded or otherwise rigidly secured to them by means of which they may be readily detachably secured to and supported by companion brackets 42 carried by the frame 25 of the gripping mechanism. Since these guide rods pass through the gripping mechanism within the vertical limits of the arcuate gripping portions of the members 35, these are provided with longitudinal recesses or grooves 43 affording adequate clearance for the rods, as will be readily understood from Figs. 2, 3 and 4.

The rods 40 are transversely spaced from one another sufficiently that the line of cans may be freely moved between them by the conveyer, but at the same time they prevent lateral displacement and/or twisting of the cans to a diagonal position on the belt, especially within the gripping mechanism, which would cause jamming and interruption of the supply of cans to the apparatus.

What is claimed is:

1. In mechanism for feeding cans to a processing apparatus or the like, a continuously operating conveyer for receiving and moving the cans to the apparatus in alined relationship; means including opposed gripping jaws movable toward and from the line of cans transversely thereof to temporarily arrest movement of a portion of such line when a determined number of cans has passed such means, said jaws having can-engaging faces provided with longitudinally extending recesses; and guide members paralleling the conveyer and extending through said arresting means, for preventing twisting of an arrested can to a diagonal position on the conveyer, said jaw recesses receiving and accommodating the guiding members during the arresting action of the jaws.

2. In mechanism for feeding cans to a processing apparatus or the like, a continuously operable conveyer belt for receiving and moving the cans to the apparatus in alined relationship; a device for intermittently arresting movement of a portion of the line of cans, including gripping members operable when a determined number of cans has passed the device to successively grip and release a can whereby to temporarily stop its progress and that of the cans following it, said gripping members having can-engaging faces provided with serrations for accommodating the beads of a can during the gripping action; and guide members extending through said device for preventing misalinement of the cans on the belt due to engagement between said serrations and the beads of moving cans.

3. In mechanism for feeding cans to a processing apparatus or the like, a continuously operable conveyer belt for receiving and moving the cans to the apparatus in alined relationship; a device for intermittently arresting movement of a portion of the line of cans, including gripping members operable when a determined number of cans has passed the device to successively grip and release a can whereby to temporarily stop its progress and that of the cans following it, said gripping members having can-engaging faces provided with serrations for accommodating the beads of a can during the gripping action; and guide members paralleling the conveyer through said device for preventing twisting of an arrested can to a diagonal position on the belt due to engagement between said serrations and the can beads as the conveyer renews movement of the cans upon release of the arresting action, said guide members being disposed in the path of movement of the gripping members, and the latter being recessed to accommodate the guide members.

HORACE L. SMITH, JR.

REFERENCES CITED

The following references are of record in the file of this patent:

UNITED STATES PATENTS

| Number | Name | Date |
|---|---|---|
| 2,368,769 | Ardell | Feb. 6, 1945 |
| 1,904,613 | Braren | Apr. 18, 1933 |